May 12, 1964 R. G. OSTENSEN 3,132,810
PHOTOGRAPHIC ILLUMINATION DEVICE
Filed April 17, 1961 3 Sheets-Sheet 1

INVENTOR.
Ralph G. Ostensen
BY
Strauch, Nolan + Neale
ATTORNEYS

May 12, 1964  R. G. OSTENSEN  3,132,810
PHOTOGRAPHIC ILLUMINATION DEVICE
Filed April 17, 1961  3 Sheets-Sheet 2
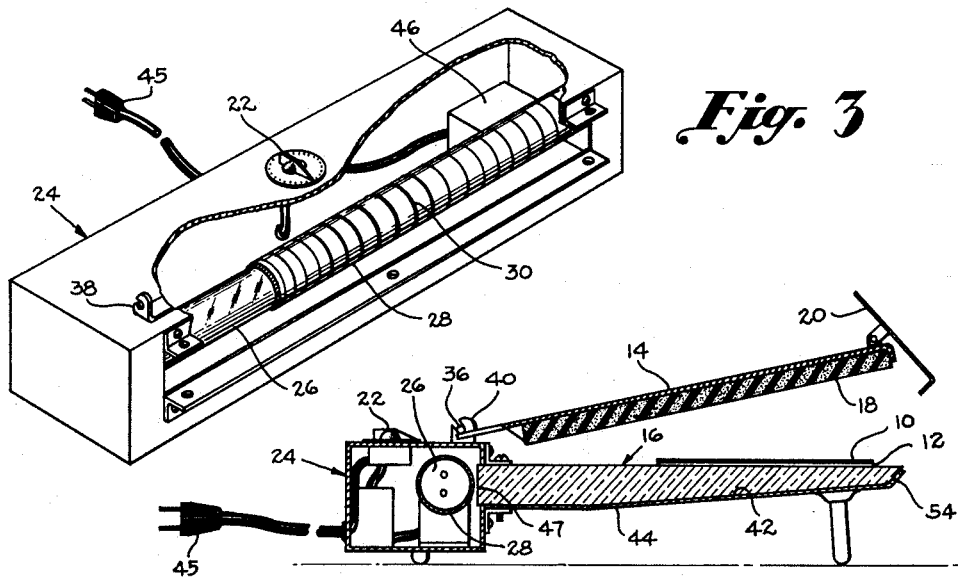
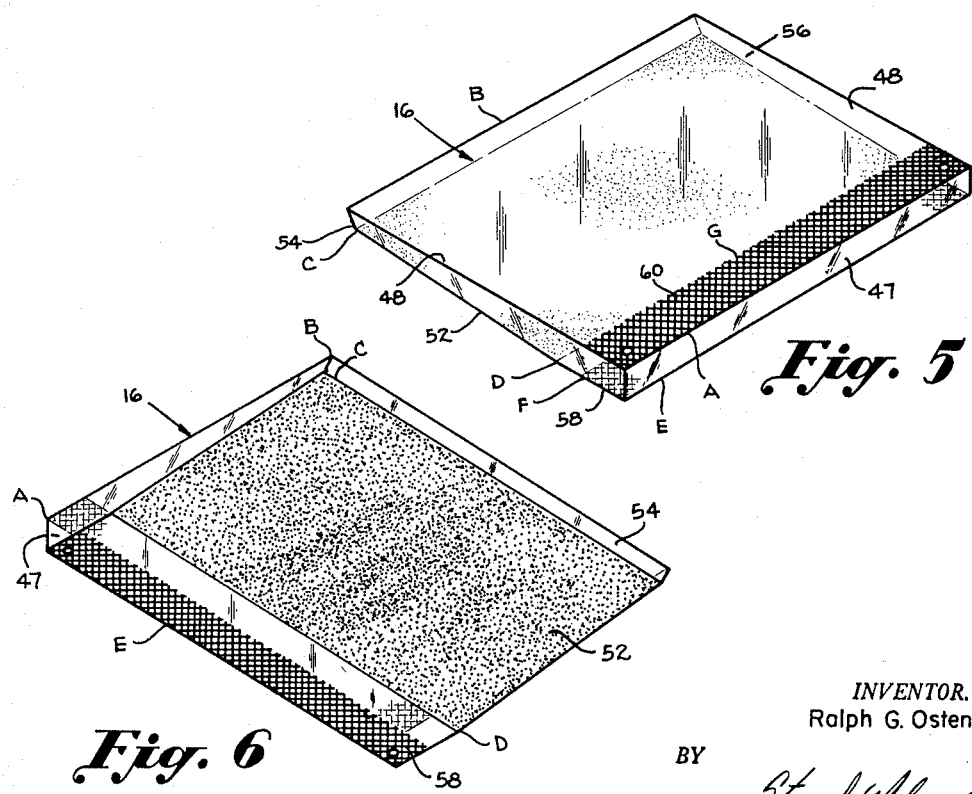
INVENTOR.
Ralph G. Ostensen

United States Patent Office

3,132,810
Patented May 12, 1964

3,132,810
PHOTOGRAPHIC ILLUMINATION DEVICE
Ralph G. Ostensen, Morton Grove, Ill., assignor to SCM Corporation, New York, N.Y., a corporation of New York
Filed Apr. 17, 1961, Ser. No. 103,355
11 Claims. (Cl. 240—1)

This invention relates to illumination devices and in particular to illumination apparatus for use in making photographic exposures of printed pages on photosensitive paper.

Many types of photo-copying exposure devices can be found on the market today but most are too cumbersome to be easily moved from one place to another. Many include liquid developing baths which make moving the device a rather hazardous operation. A great number of these machines are equipped with inferior light distributing elements and, as a result, faded out areas and hot spots occur on the copies and make good copy reproduction frequently difficult. The large size of their light distributing elements make them clumsy for making exposure close to the binding of heavily bound volumes and occasionally entirely impossible without permanent injury to the backing of the book. While edge lighted wedge-like prisms have been provided heretofore for illumination and photo-copy purposes, as is shown for example, by United States Patent Nos. 2,247,737 issued July 1, 1941 to G. E. Weeks for "Inspection Apparatus," 2,347,665 issued May 2, 1944 to G. B. Christensen et al. for "Internal Reflection Lighting Means," and 2,511,102 issued June 13, 1950 to B. E. Clouser for "Photocopy Device Having a Translucent Prism Support," such devices have not provided the uniformity of light distribution essential to a practical contact exposure device, producing hot spots adjacent the light source and improperly illuminated faded out areas along the other edges.

This invention is novel in that it employs a simple, relatively inexpensive light distributing element which is in the form of a modified wedge-like prism provided with an improved arrangement of light absorbing and reflecting elements which make practical for the first time the use of an essentially wedge-shaped, edge-lighted prism as a contact exposure device.

The primary object of this invention is, therefore, the provision of a vastly superior light distributing element which will eliminate all faded out areas and hot spots on the photosensitive paper.

Another object of this invention is the provision of a relatively simple photo-copying exposure device which is not only light in weight but comparatively inexpensive to manufacture.

Still another object of this invention is the provision of a photo-copying exposure device which may be used to copy the pages of any book or heavily bound volumes without injury to the book or volume as well as flat sheets of paper.

These and other objects of the present invention will become more fully apparent from the appended claims and the descriptive text that follows.

Basically, the apparatus consists of a rectangular and somewhat wedge-shaped light-conductive prismatic element with a support cover, a light box and a timer. The material to be copied or exposed is inserted between one lateral face of the light-conductive prismatic element and the cover along with a sheet of photosensitive paper. The cover is then closed and a timer control turned on. After a predetermined time interval, the original and copy are removed and exposure has been completed. The same procedure is used when copying the pages of a book except that the cover of the device is removed and the book is held down upon the light emitting surface of the light-conductive element with the photosensitive paper between the page of the book and the element.

The invention will be more easily understood by referring to the following drawings and text.

FIGURE 3 is a cut-away perspective view of the light box section of the device of FIGURE 1;

FIGURE 4 is a sectional view taken along line 4—4 in FIGURE 1;

FIGURE 5 is a perspective drawing of the light-conductive element as seen from above;

FIGURE 6 is a perspective drawing of the light-conductive element as seen from below;

Figure 1:
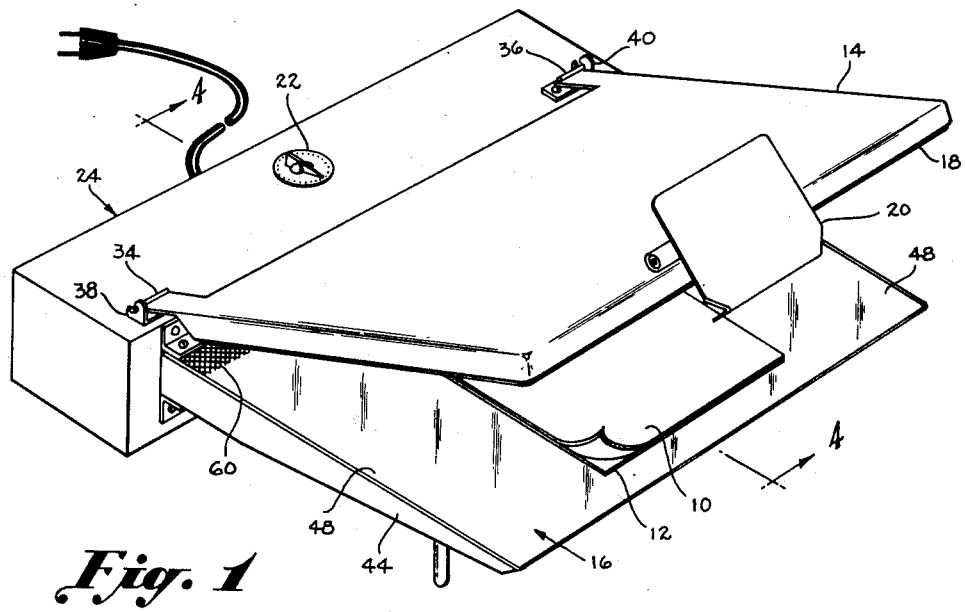
FIGURE 1 is a perspective view of a photo-copy device embodying the principles of the invention, showing it in a condition in which it can be used to copy a flat single sheet.

FIGURE 1 shows a complete physical embodiment of the invention. An original 10 to be copied and a sheet of photosensitive copy paper 12 are inserted as a two ply laminar assembly between a pivoted cover 14 and the upwardly facing light emitting surface of a light-conductive element 16. Element 16 is a homogenous wedge-like prismatic body of internally reflective light transmitting material which, in the specific illustrated and preferred embodiment, is formed of methyl methacrylate, (or as it is commercially known, "Lucite"). Element 16 will hereinafter be referred to as a Lucite wedge for simplicity. The invention is not, however, thus restricted, as any similar hard or rigid light-conductive material which exhibits the phenomenon of total internal reflection can be used.

With the original 10 and the photosensitive paper 12 in place, the top cover 14 is brought down until a compression pad 18 (see also FIGURE 3) of plastic foam or sponge rubber compresses the two sheets 10 and 12 against the light emitting planar surface of the Lucite wedge 16. The top cover 14 is then locked in place by latch 20 and the timer 22, located in the light box 24, is then turned on. As is most clearly shown in FIGURES 3 and 4, located inside of the light box 24 (FIGURE 3) is a tubular fluorescent lamp 26 which is covered by a vinyl sleeve 28 circumferentially lined with numerous graduated fine black circles 30 at predetermined axially spaced intervals. The sleeve 28 is of a conventional construction which is frequently used on tubular fluorescent lamps to insure that a more even light distribution is attained along the full length of the tube.

When the timer 22 is turned on, the fluorescent lamp 27 is instantly lighted and, after the proper length of time necessary to expose the photo-sensitive paper 12, the timer 22 shuts off the machine automatically and the exposed copy paper can then be removed.

Figure 2:
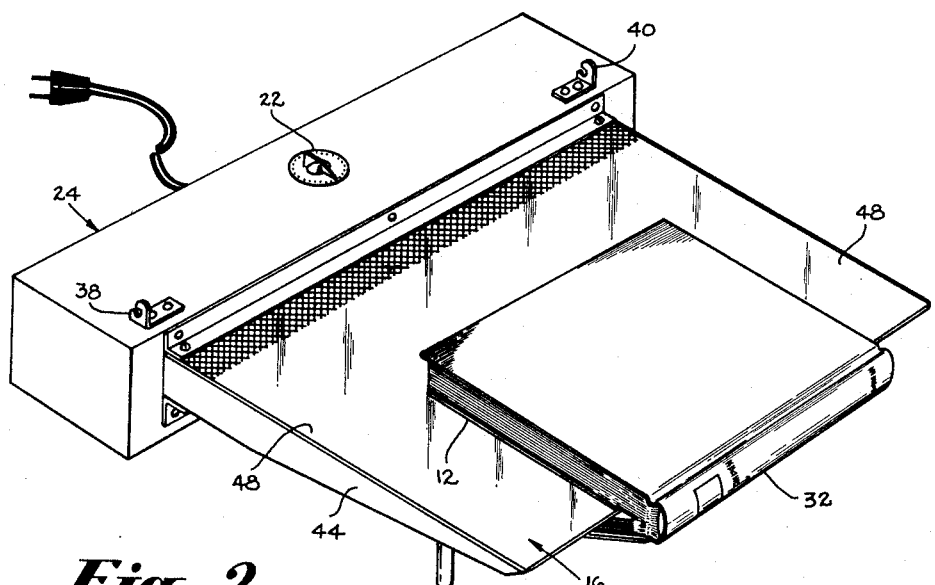
FIGURE 2 is a perspective view of the device of FIGURE 1 showing the cover removed and the machine in a condition to copy a page of a book.

FIGURE 2 shows the machine set up to copy a page of book 32. In this operation the top cover 14 is removed, a feat easily accomplished by merely lifting the hinge pins 34 and 36 (FIGURE 1) out of the slotted brackets 38 and 40. The photosensitive paper 12 is then placed on the light emitting surface of the Lucite wedge 16 and the page to be copied is placed thereon. The timer 22 is then turned on and, as in the single copy reproduction, the proper exposure of the photosensitive paper will result in a perfect copy. It may be helpful to press down firmly on the book 32 by hand to insure that the photosensitive paper 12 is absolutely flat, which it must be to avoid blurred edges and distortion in reproduction of the printed matter closest to the page edge nearest the binding of the book 32. The Lucite wedge, due to its relatively sharp edge, fits easily between the pages of the book 32 closely adjacent the binding without injury to the binding.

Generally, the structure of the apparatus is simple. The light box 24 can be constructed of sheet metal, die cast or made of wood. Metal is preferred for a more sturdy construction. This also applies to the top cover 14 and the support 44 for the Lucite wedge 16. Wiring of the apparatus is very simple and follows standard methods. Electric power is supplied from any A.C. outlet through plug 45 through a switch controlled by timer 22 and transformer 46 to the input terminals of lamp 26.

The fluorescent lamp 26, the vinyl sleeve 28, the transformer 46 and the timer 22 are all standard items and can be of any well known commercially available construction.

An important item to note at this point in relation to the fluorescent lamp 26 is that the length of the light emitting portion of the lamp 26 should be longer than the length of and of greater diameter than the width of light receiving edge 47 of the Lucite wedge 16 to assure uniformity of light concentration over the entire surface of edge 47 and thereby prevent faded out areas on the copy paper overlying the light emitting surface of wedge 16 adjacent its lateral outside edges 48.

Figure 7:
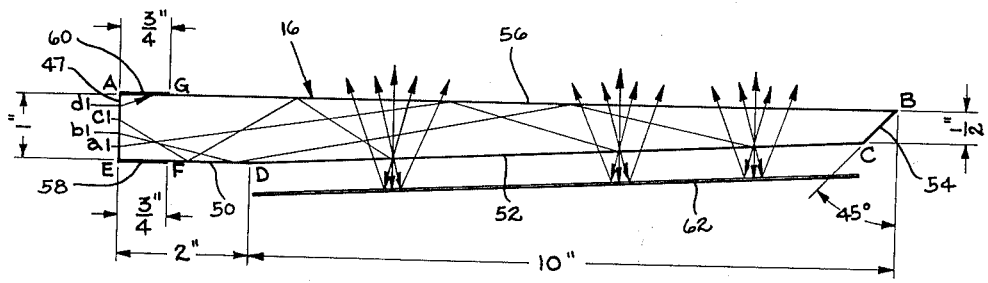
FIGURE 7 is a diagrammatic cross section of the light-conductive element.

The most important part of this invention is the novel formation of the Lucite wedge 16 which embodies a very special geometry and arrangement of light absorbing, reflecting and diffusing surfaces which, it has been discovered, gives a more uniform lighting over the entire copying surface 50 than any other design known to applicant. Referring to FIGURES 5–7, the wedge 16 is a wedge-like prism having five lateral planar faces 47, 50, 52, 54 and 56. Faces 50 and 56 are planar and parallel and are normal to the light receiving edge face 47 which they intersect at lines E and A respectively. Surface 56 is the light emitting face of wedge 16. Surface 52 intersects surface 50 at line D at a large obtuse angle and is inclined to surface 56 at a small acute angle. The end face 54 intersects face 52 at line C at an obtuse angle and face 56 at line B at an acute angle (approximately 45°) sufficiently small to permit insertion of the wedge 16 between the pages of a book with the line B closely adjacent its binding without injury to the binding and sufficiently large for structural strength and rigidity. Lines A, B, C, D and E are all parallel. Faces 47, 50, 54 and 56 are all polished. Face 52 is uniformly roughened as by sand blasting and functions as a light diffuser. Equal width portions 58 and 60 (bounded by the lines E and F and by the lines A and G respectively) of polished surfaces 50 and 56 are covered with a light absorbing material such as black paint.

As is apparent from FIGURE 7, in the preferred embodiment of the present invention, the surface portions 58 and 60 are each ¾″ wide, the face 47 is 1″ wide, the width between the line E and D is 2″, the over-all width of the surface 56 between the line A and B is 12″, the width of the surfaces 52 and 54 measured parallel to the surface 56 is 10″, and the width of the surface 54 measured parallel to the surface 47 is ½″. Accordingly, the width of the lateral face 56 is in the order of 12 times the width of the lateral face 47; the width of the lateral face 50 is in the order of twice the width of the lateral face 47; and the width of the bands 58 and 60 is in the order of three-fourths the width of the lateral face 47.

As will be noted in FIGURE 7, four typical light rays are shown as $a_1$, $b_1$, $c_1$ and $d_1$. Ray $a_1$ impinges on the edge face 47 (the entrance pupil), impinges upon surface 56 between the lines G and B at an angle to the normal greater than the critical angle and therefore is reflected thereby and hits light scattering roughened surface of face 52 (DC). Ray $a_1$ is somewhat broken up upon hitting surface 52, half being emitted from the roughened face 52 (DC), and half being reflected through the Lucite wedge 16 and impinging on surface 56 (AB) at an angle to the normal less than the critical angle and thus leaving the Lucite wedge 16. Ray $b_1$ exhibits the same characteristics of ray $a_1$ except that it impinges upon and is reflected by face 50 between lines F and D before being reflected by face 56. Rays $a_1$ and $b_1$ are typical of the rays necessary for light to emerge from surface 50 (AB) in a uniform pattern.

To correct for the phenomena of hot spots or greater levels of light intensity usually found adjacent the light source in the prior designs of edge lighted panels, the present invention provides means for intercepting the undesirable rays and means for increasing the probability of internal reflection within the Lucite wedge 16 before a ray impinges on the light scattering surface 52.

Ray $c_1$ hits surface 50 between lines D and F at an angle to the normal greater than the critical angle, is then reflected up to surface 56 (BG) and is then reflected downward again to a light scattering point on surface 52 (CD) at a distance further along down the Lucite wedge 16 than would have been found if this ray had hit surface 52 (CD) immediately after entering the Lucite wedge 16. Due to the fact that there are many rays that will exhibit this same path, the present invention purposely provides the reflective area between lines E and D so as to cause many of these rays to be reflected further down the Lucite wedge 16 before impinging on face 52 thus eliminating the hot spots close to the edge 47 (the entrance pupil).

Finally, ray $d_1$ enters the Lucite wedge 16 and is immediately absorbed by the black painted area 60 (AG). This degree of down grading is necessary to prevent the large number of random rays entering edge 47 (the entrance pupil) from also causing greater levels of light intensity or hot spots along this edge. Black painted area 58 (EF) serves the same purposes.

The specific dimensions of one practical embodiment of the wedge 16 when made of Lucite are given in FIGURE 7. The relative proportions of these dimensions should be kept substantially the same for optimum results.

Figure 8:
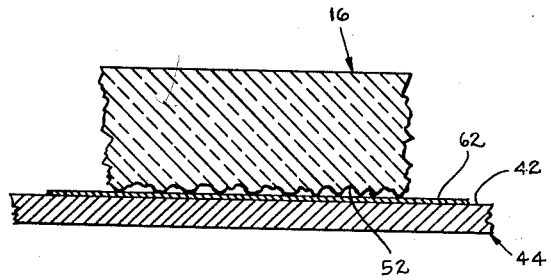
FIGURE 8 is a much enlarged section of the light-conductive element showing a paper reflector adjacent the sand blasted light diffusing roughened surface.

As noted in FIGURE 7 a certain amount of light emanates from the sand blasted surface 52 and would normally be lost. To recapture this "lost" light, the present invention provides a sheet of white paper 62 adjacent, but not in full surface to surface optical contact with, the sand blasted surface 52. The actual relation between surface 52 and sheet 62 is shown in FIGURE 8. The "lost" light is then reflected and caused to re-enter the Lucite wedge 16, augmenting the light emanating from the printing surface 56. Thus, it will be seen that maximum use has been made of the light source 26. It is, of course, understood that instead of using white paper 62 as a reflector, the inside surface 42 of wedge support 44 (FIGURE 4) can be painted white thus achieving the same effect.

The relative dimensions of the Lucite wedge 16 are very precise and, as stated before, embody a geometry that has been found to give the most uniform lighting over the entire surface 56. All of the edges of the Lucite wedge 16 are polished except, as mentioned before, surface 52 which has been sand blasted to provide the light scattering points necessary for good light distribution.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a wedge-like prism of internally reflective light transmitting material having a light receiving first lateral face, parallel second and third lateral faces intersecting and normal to said first lateral face and a fourth lateral face intersecting said third lateral face at an obtuse angle, the width of said second lateral face being greater than the combined width of said third and fourth lateral faces measured parallel to said second face, the surface of said fourth lateral face being uniformly roughened and the surfaces of the remaining lateral faces being polished, said second and third lateral faces being covered adjacent said first lateral face with bands of light absorbing material, and means for introducing light rays into said prism through said first face.

2. The combination defined in claim 1 wherein the width of said second lateral face is in the order of twelve times the width of said first lateral face.

3. The combination defined in claim 1 wherein the width of said third lateral face is in the order of twice the width of said first lateral face.

4. The combination defined in claim 1 wherein the width of said bands of light absorbing material is in the order of three-fourths the width of said first lateral face.

5. In combination with an elongated light source, a substantially wedge-shaped body of internally reflective light transmitting material having a polished planar light emitting surface, a light diffusing surface opposed in acute angular relationship to said polished planar light emitting surface, a light receiving edge surface adjacent said light source, efficient light ray absorbing means disposed on the external surfaces of said body adjacent said light receiving edge surface to minimize internal reflection of light impinging on said surfaces of said body adjacent said light receiving edge, and light ray reflecting means including a surface intermediate said light receiving edge surface and said diffusing surface and having at least a portion extending substantially beyond said light ray absorbing means toward said diffusing surface to cause light rays impinging thereon to be reflected further down the wedge shaped body before impinging on said light diffusing surface for establishing substantially uniform intensity of emission from the entire area of said emitting surface.

6. The combination defined in claim 5 wherein said absorbing means comprise parallel bands of light absorbing material on the opposite external surfaces of said body adjacent said edge surface and wherein said surface of said light ray reflecting means is a light reflective surface parallel to said emitting surface.

7. An internally homogenous body of light transmitting material having a first polished external planar rectangular surface, a second polished external surface normal to and intersecting said first surface, a third polished external surface intersecting said first surface and extending parallel to said second surface, said second surface being of substantially greater extent normal to the plane of said first surface than said third surface, a fourth uniformly roughened planar external surface intersecting said third surface in a line lying substantially parallel to the line of intersection of said first surface with said second surface, the included angle between the planes of said second and fourth surfaces internally of said body being an acute angle whereby substantially all light rays entering said body through said first surface and impinging directly upon said second and third surfaces will be reflected internally of said body upon said fourth surface and light rays entering said body through said first surface and impinging directly or indirectly upon said fourth surface will be diffused upon impingement upon said fourth surface and a major portion thereof emitted from said body through said second surface.

8. The combination defined in claim 7 further including a band of light ray absorbing material on each of said second and third surfaces at their juncture with said first surface.

9. The combination defined in claim 8 wherein said bands are of substantially equal width normal to the plane of said first surface.

10. The combination defined in claim 7 further including a fifth external polished surface intersecting said second and fourth surfaces in lines parallel to said first surface and defining an acute angle with said second surface internally of said body and an obtuse angle with said fourth surface internally of said body.

11. The combination defined in claim 7 further including a planar reflector externally of said body disposed in parallel relation to said fourth surface.

References Cited in the file of this patent

UNITED STATES PATENTS

| | | |
|---|---|---|
| 2,247,737 | Weeks | July 1, 1941 |
| 2,347,665 | Christensen et al. | May 2, 1944 |
| 2,358,203 | Best | Sept. 12, 1944 |
| 2,511,102 | Clouser | June 13, 1950 |
| 2,646,637 | Nierenberg et al. | July 28, 1953 |
| 2,723,342 | Neugass | Nov. 8, 1955 |
| 2,761,056 | Lazo | Aug. 28, 1956 |
| 2,831,453 | Hardesty | Apr. 22, 1958 |
| 2,907,869 | Hudson et al. | Oct. 6, 1959 |

FOREIGN PATENTS

| | | |
|---|---|---|
| 664,193 | Great Britain | Jan. 2, 1952 |
| 1,091,225 | France | Oct. 27, 1954 |